(12) United States Patent
Go et al.

(10) Patent No.: US 12,164,820 B2
(45) Date of Patent: Dec. 10, 2024

(54) IMAGE FORMING APPARATUS CAPABLE OF BACKING UP CONTENTS OF SETTINGS FOR JOB

(71) Applicant: KYOCERA Document Solutions Inc., Osaka (JP)

(72) Inventors: Keanu Go, Osaka (JP); Eliot Emerson Uy, Osaka (JP); Romel Dianon, Jr., Osaka (JP); Roy Vincent Maranon, Osaka (JP); Peter James Bulat-Ag, Osaka (JP); J'mark Ramos, Osaka (JP); Gerald Galanida, Osaka (JP); Hazel Ozon, Osaka (JP); Fritzer Abapo, Osaka (JP); Maria Johanna Ybanez, Osaka (JP); Kenneth Kienzle Arrieta, Osaka (JP); July Descartin, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/381,316

(22) Filed: Oct. 18, 2023

(65) Prior Publication Data
US 2024/0134585 A1 Apr. 25, 2024
US 2024/0231724 A9 Jul. 11, 2024

(30) Foreign Application Priority Data

Oct. 19, 2022 (JP) .................. 2022-167825

(51) Int. Cl.
*G06F 3/12* (2006.01)

(52) U.S. Cl.
CPC .......... *G06F 3/1257* (2013.01); *G06F 3/1204* (2013.01); *G06F 3/1205* (2013.01)

(58) Field of Classification Search
CPC ..... G06F 3/1257; G06F 3/1204; G06F 3/1205
See application file for complete search history.

(56) References Cited

U.S. PATENT DOCUMENTS

| 7,826,087 | B2 | 11/2010 | Kumagai |
| 8,947,721 | B2 | 2/2015 | Hirokawa et al. |
| 2007/0086022 | A1* | 4/2007 | Kumagai ............... H04N 1/00 358/1.1 |
| 2015/0062644 | A1* | 3/2015 | Ishii ...................... G06F 3/1257 358/1.15 |
| 2016/0224298 | A1* | 8/2016 | Nogawa ............. H04N 1/00917 |
| 2019/0095141 | A1* | 3/2019 | Yoshihara ............. G06F 3/0488 |

(Continued)

*Primary Examiner* — Iriana Cruz
(74) *Attorney, Agent, or Firm* — IP Business Solutions, LLC

(57) ABSTRACT

An image forming apparatus includes: a controller that allows a display device to display a settings screen for setting of a function by a user and executes a job based on a user setting made through the settings screen; and a backup device that backs up as backup data the user setting on a storage device each time the user setting is made. When execution of the job based on the user setting is completed, the controller deletes the user setting from the storage device. When, in newly displaying a settings screen on the display device for another job, the user setting for a function configurable on the settings screen is saved on the storage device, the controller determines the content of the user setting as a content of a setting for the job and allows the display device to display the settings screen showing the content of the setting.

5 Claims, 8 Drawing Sheets

(56) References Cited

U.S. PATENT DOCUMENTS

2021/0096799 A1* 4/2021 Chew .................... G06F 3/1231
2021/0271768 A1* 9/2021 Imayoshi ................ G06F 21/31
2022/0147293 A1* 5/2022 Kaneko ................ G06F 3/1238

* cited by examiner

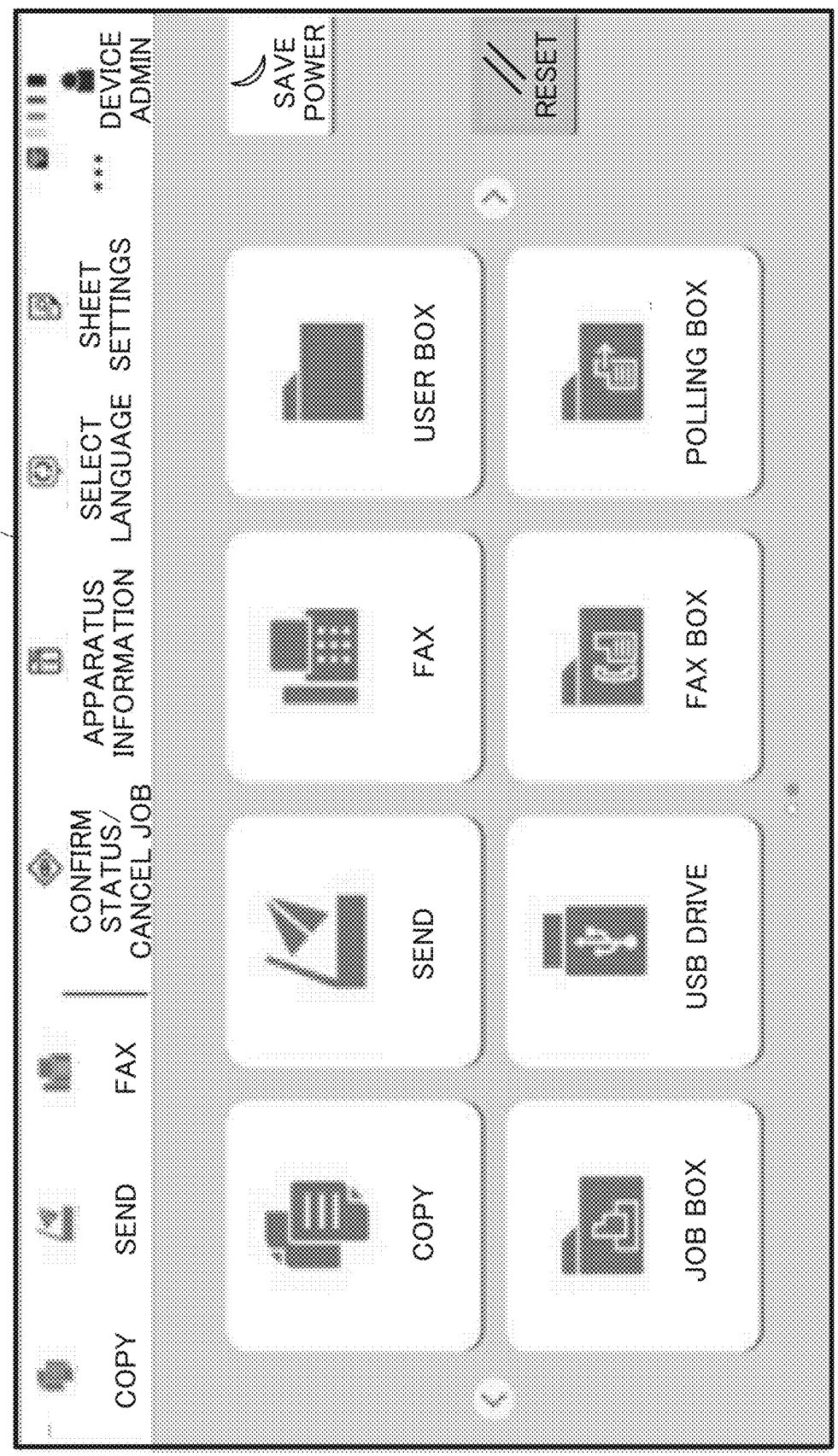

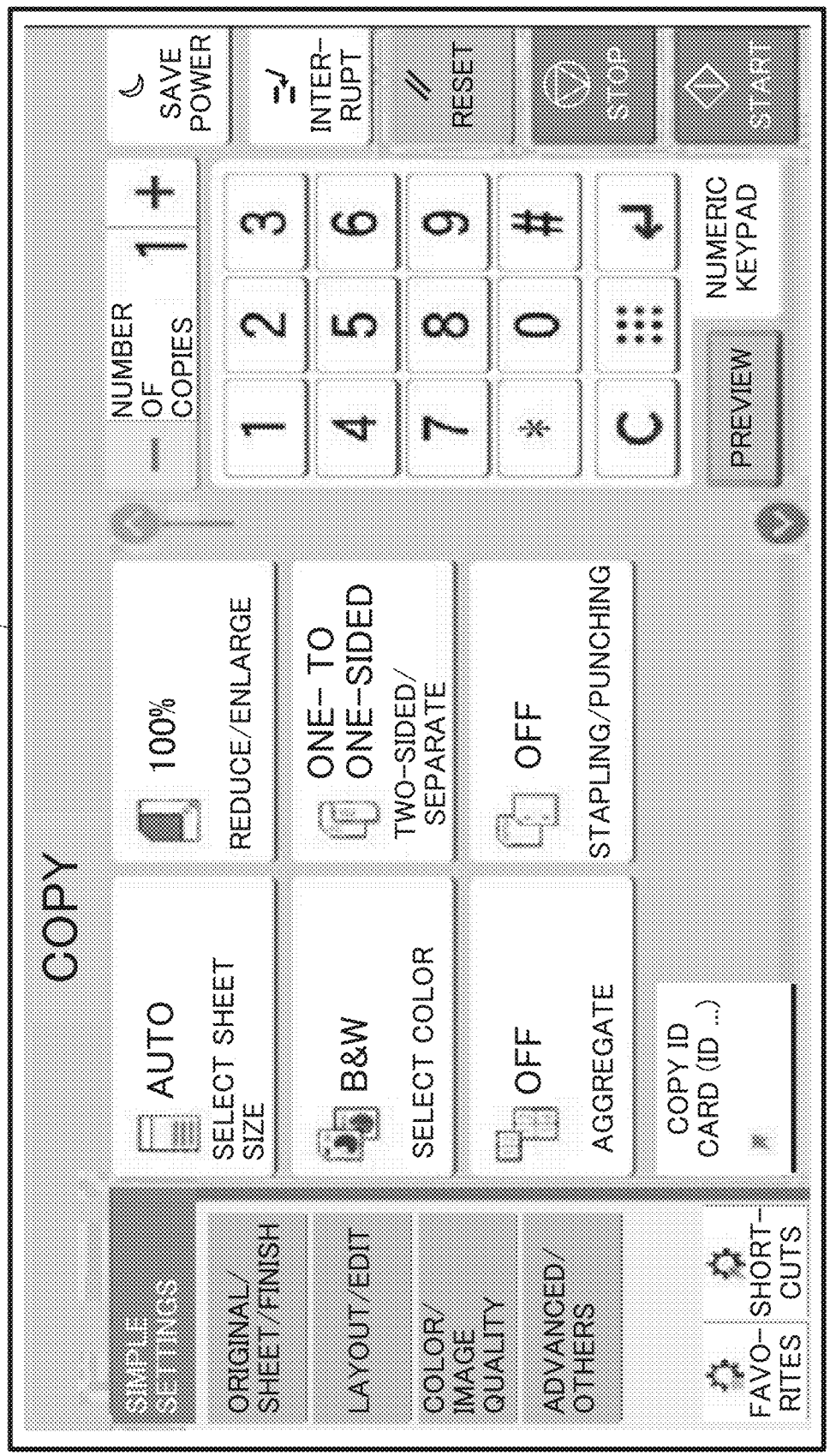

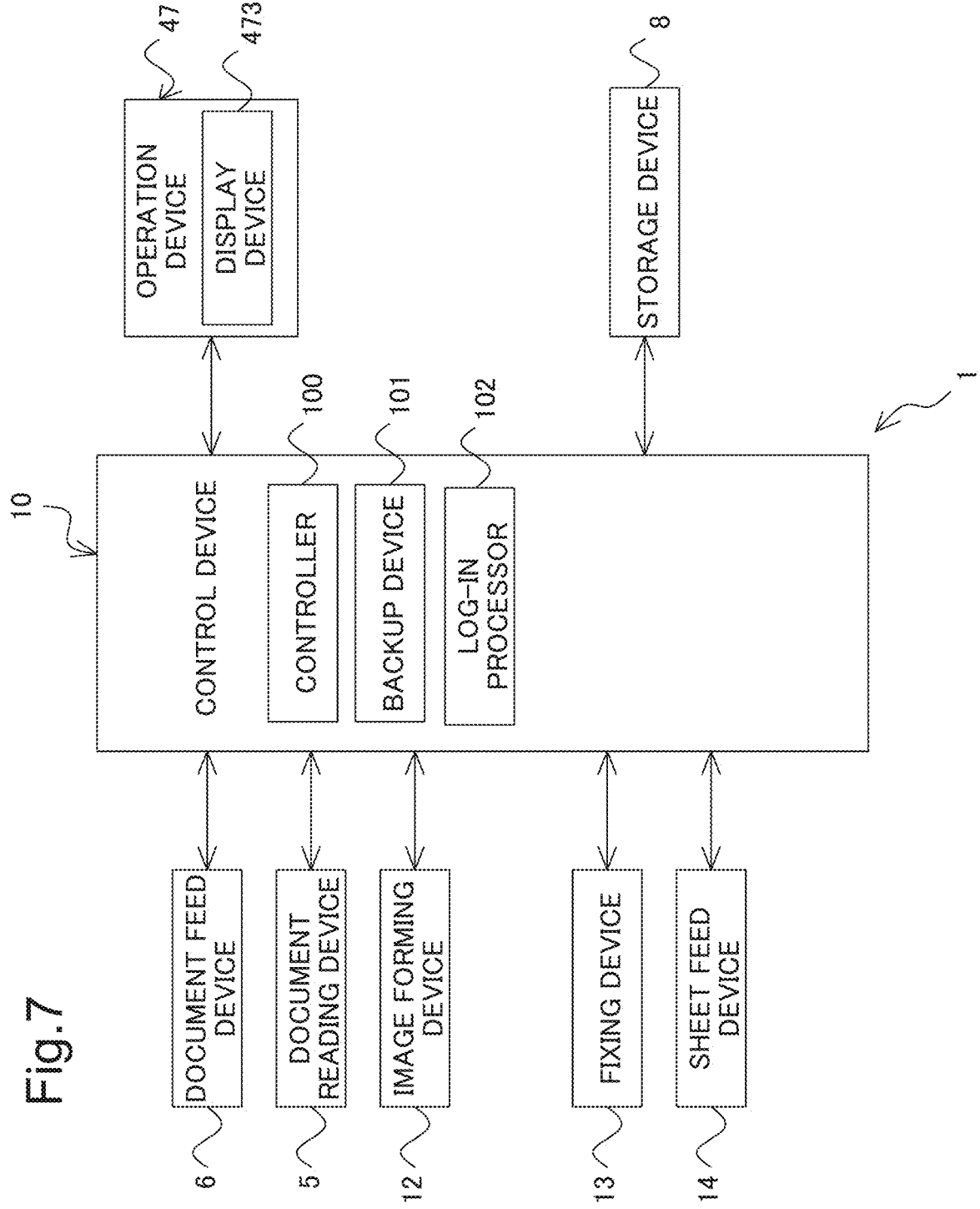

200~# IMAGE FORMING APPARATUS CAPABLE OF BACKING UP CONTENTS OF SETTINGS FOR JOB

INCORPORATION BY REFERENCE

This application claims priority to Japanese Patent Application No. 2022-167825 filed on Oct. 19, 2022, the entire contents of which are incorporated by reference herein.

BACKGROUND

The present disclosure relates to image forming apparatuses and particularly relates to an image forming apparatus capable of backing up the contents of settings for a job.

There is known, as an image forming apparatus capable of reusing the contents of settings for a job, an image forming apparatus that saves information on settings for a job for the image forming apparatus in a portable external storage medium, such as a USB (universal serial bus) memory, and thus enables configuration of settings for jobs on the same or similar image forming apparatuses.

SUMMARY

A technique improved over the aforementioned technique is proposed as one aspect of the present disclosure.

An image forming apparatus according to an aspect of the present disclosure includes a display device, an instruction acceptor, a controller, a non-volatile storage device, and a backup device. The instruction acceptor accepts an instruction specifying a content of a setting for a job from a user. The controller allows the display device to display a settings screen on which the user makes a setting for an executable function and the controller executes the job based on a user setting indicated by the instruction accepted by the instruction acceptor through the settings screen. The backup device backs up the user setting on the non-volatile storage device. When execution of the job based on the user setting is completed, the controller deletes the user setting from the non-volatile storage device. When, in newly displaying the settings screen on the display device, the user setting for a function shown on the setting screen is backed up on the non-volatile storage device, the controller determines a content of the user setting as a content of a setting for a job and allows the display device to display the settings screen showing the content of the user setting.

BRIEF DESCRIPTION OF THE DRAWINGS

FIGS. 2A and 2B are views showing examples of screens displayed on a display device.

FIG. 7 is a functional block diagram schematically showing an essential internal configuration of an image forming apparatus according to a second embodiment.

DETAILED DESCRIPTION

Figure 1:
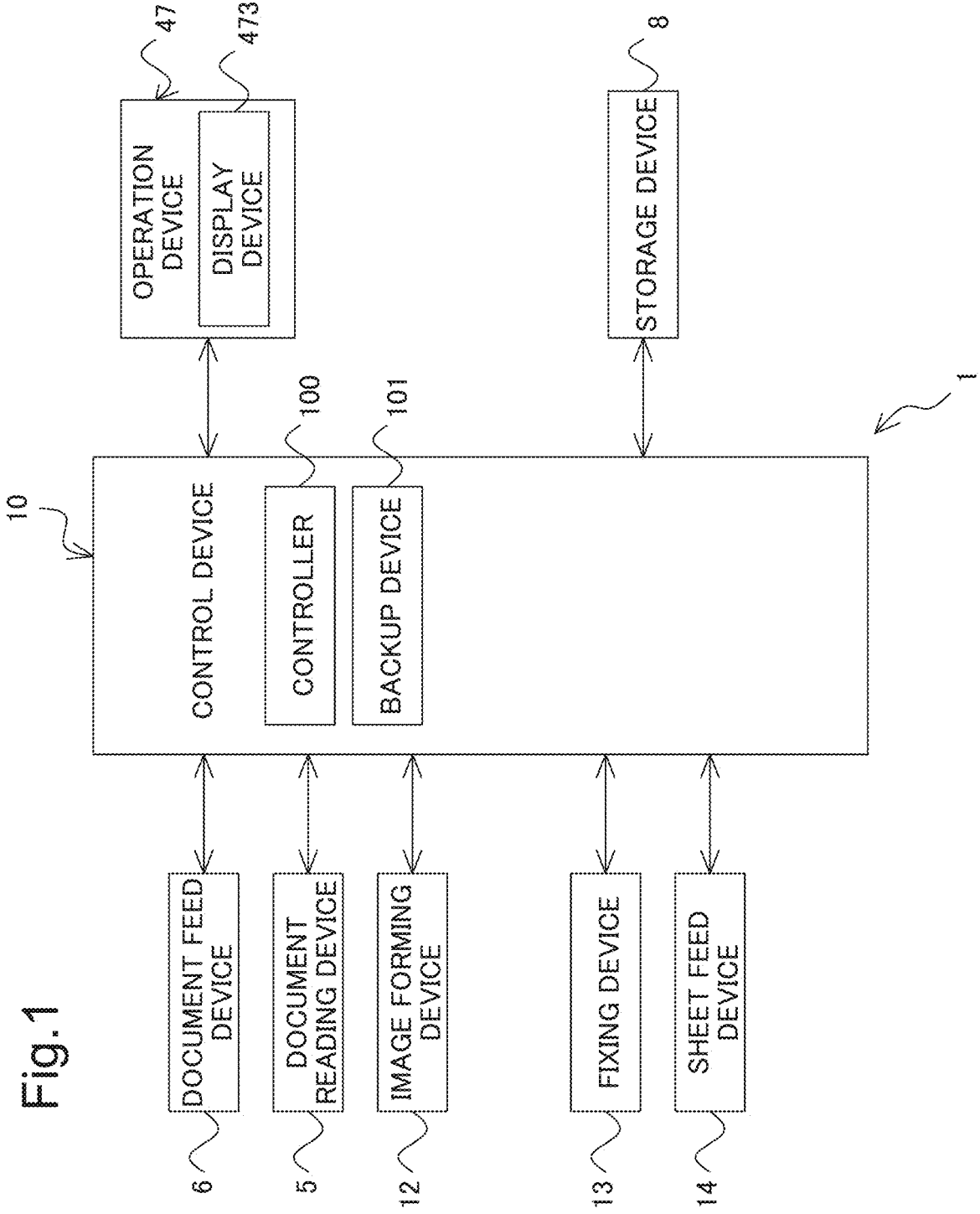
FIG. 1 is a functional block diagram schematically showing an essential internal configuration of an image forming apparatus according to an embodiment of the present disclosure.

Hereinafter, a description will be given of an image forming apparatus according to an embodiment of the present disclosure with reference to the drawings. FIG. 1 is a functional block diagram schematically showing an essential internal configuration of an image forming apparatus according to an embodiment of the present disclosure. An image forming apparatus 1 according to a first embodiment is, for example, a multifunction peripheral having multiple functions, such as a copy function, a print function, a scan function, and a facsimile function.

The image forming apparatus 1 is made up by including a control device 10, a document feed device 6, a document reading device 5, an image forming device 12, a fixing device 13, a sheet feed device 14, an operation device 47, and a storage device 8.

The document feed device 6 is capable of being opened and closed with respect to the top surface of the document reading device 5 by being mounted by unshown hinges or the like on the top surface of the document reading device 5, and functions as a document holding cover while the document reading device 5 reads an original document sheet placed on an unshown platen glass. Furthermore, the document feed device 6 is an ADF (auto document feeder), includes an unshown document loading tray, and feeds original document sheets loaded onto the document loading tray to the document reading device 5 sheet by sheet.

First, a description will be given of the case where a document reading operation is performed on the image forming apparatus 1. The document reading device 5 optically reads an image of an original document sheet fed to the document reading device 5 by the document feed device 6 or an image of an original document sheet placed on the platen glass and generates image data on the original document sheet. The image data generated by the document reading device 5 is saved in an unshown image memory or the like.

Next, a description will be given of the case where an image forming operation is performed on the image forming apparatus 1. Based on image data generated by the document reading operation, image data stored in the image memory or the like, image data received from a computer connected via a network or another image data, the image forming device 12 forms a toner image on a recording paper sheet as a recording medium fed from the sheet feed device 14.

The fixing device 13 applies heat and pressure to the recording paper sheet with the toner image formed thereon by the image forming device 12, thus fixing the toner image on the recording paper sheet. The recording paper sheet subjected to the fixation processing is discharged to an unshown sheet output tray. The sheet feed device 14 includes a sheet feed cassette.

The operation device 47 accepts operator's instructions for various types of operations and processing executable by the image forming apparatus 1, such as an instruction to execute an image forming operation. The operation device 47 includes a display device 473 that displays operation guidance and other types of information for the operator. Furthermore, the operation device 47 accepts, through a touch panel provided on the display device 473, input of a user's instruction based on an operation (a touch gesture) of a user on the operation screen displayed on the display device 473.

The display device 473 is formed of a liquid crystal display (LCD) or the like. The display device 473 is provided with the touch panel. When the operator makes a touch gesture on a button or key being displayed on the screen, the touch panel accepts an instruction associated with a point where the touch gesture has been made.

The storage device 8 is a large storage device, such as an HDD (hard disk drive) or an SSD (solid state drive), which is a non-volatile storage device, and stores various control programs and others.

The control device 10 is made up by including a processor, a RAM (random access memory), a ROM (read only memory), and a dedicated hardware circuit. The processor is, for example, a CPU (central processing unit), an ASIC (application specific integrated circuit) or an MPU (micro processing unit). The control device 10 includes a controller 100 and a backup device 101.

When the processor operates in accordance with a control program stored in the storage device 8, the control device 10 functions as the controller 100 and the backup device 101. However, each of the controller 100 and the other component may not be implemented by the operation of the processor in accordance with the control program but may be constituted by a hardware circuit. Hereinafter, the same applies to the other embodiments unless otherwise stated.

The controller 100 governs the overall operation control of the image forming apparatus 1. The controller 100 is connected to the document feed device 6, the document reading device 5, the image forming device 12, the fixing device 13, the sheet feed device 14, the operation device 47, and the storage device 8 and controls the operations of these components.

For example, the controller 100 controls the display of the display device 473 to allow the display device 473 to display a selection screen on which the user can select a function to be executed from among a plurality of functions assumed to be executable on the image forming apparatus 1 and also allow the display device 473 to display, as a screen belonging to a lower hierarchical level than the selection screen, a settings screen on which the user can make settings for each of the functions, and executes a job based on user settings made through the settings screen by the user.

For another example, the controller 100 controls the operations of the image forming device 12 and other components involved to execute a copy job for allowing these components to form a document image acquired by reading of an original document sheet by the document reading device 5 on a recording paper sheet as a recording medium.

FIGS. 2A and 2B are views showing examples of screens displayed on the display device 473 by the controller 100. An operation screen OP1 shown in FIG. 2A is a selection screen on which the user can select a function to be executed from among a plurality of functions assumed to be executable on the image forming apparatus 1, and contains a "Copy" button, a "Send" (scan function) button, a "Fax" (facsimile function) button, and so on. The operation screen OP1 as the selection screen serves also as a home screen HS.

When the user presses the "Copy" button on the operation screen OP1 (the home screen HS), an instruction to select a copy function is accepted by the operation device 47 and, according to this instruction, the controller 100 allows the display device 473 to display an operation screen OP2 shown in FIG. 2B.

The operation screen OP2 belongs to a lower hierarchical level than the home screen HS and is a settings screen SS on which the user can make settings for the "Copy" function. The operation screen OP2 contains six buttons shown in the middle thereof: "Select Sheet Size", "Select Color", "Aggregate", "Reduce/Enlarge", "Two-sided/Separate", and "Stapling/Punching". These buttons are images for use in accepting settings for the "Copy" function.

Figure 3:
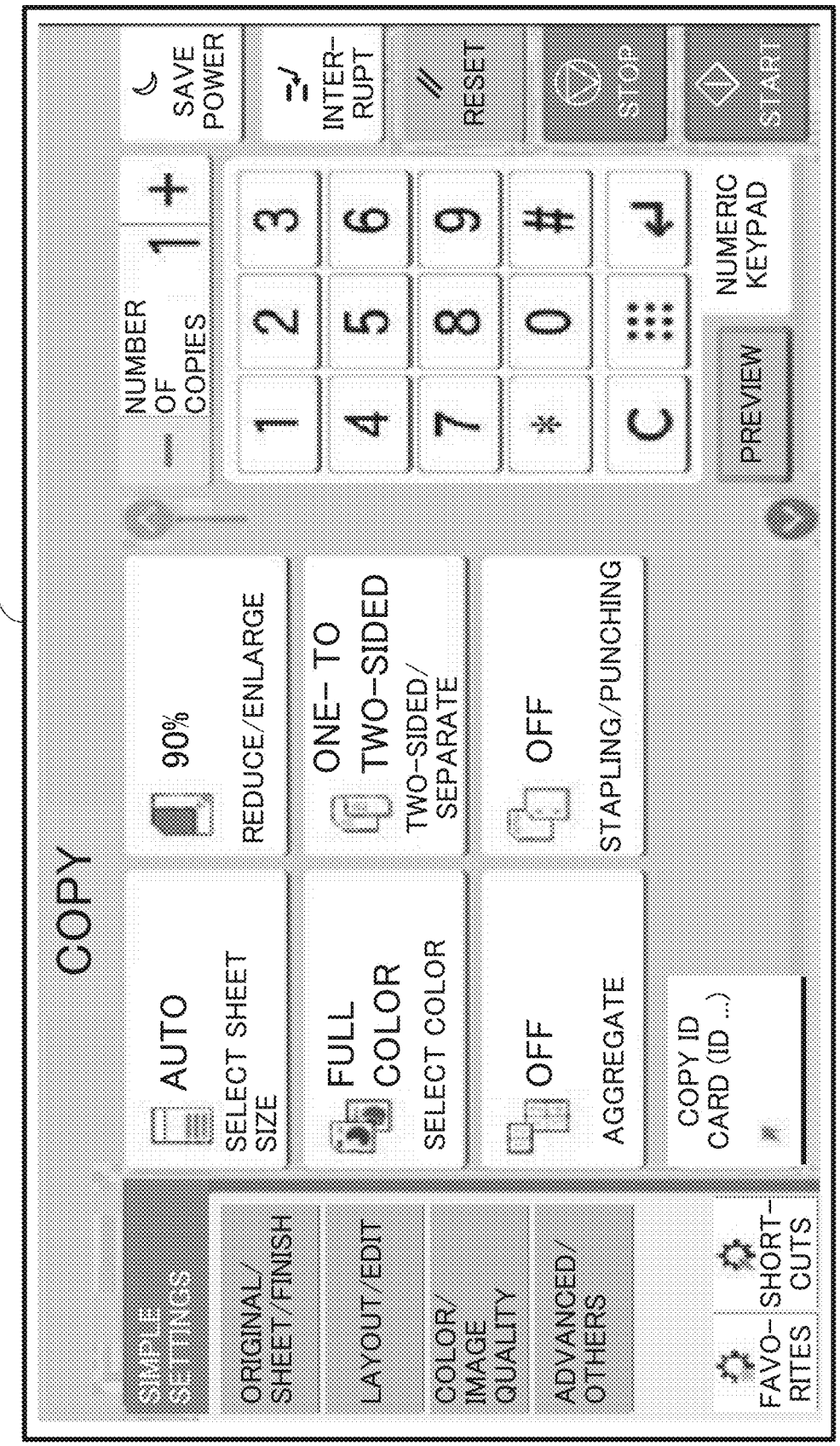
FIG. 3 is a view showing an example of a screen displayed on the display device.

FIG. 3 is a view showing an example of the settings screen SS where user settings have been made, and shows a state where "Full Color" is selected in terms of "Select Color", "90%" is selected in terms of "Reduce/Enlarge", and "One-to Two-sided" is selected in terms of "Two-sided/Separate".

The backup device 101 backs up (hereinafter, referred to as "saves"), on the storage device 8 serving as the non-volatile storage device, user settings for a specific function (the copy function in this example), user settings being made of values of items indicated by user's instructions accepted through the settings screen SS by the operation device 47 (an example of the instruction acceptor defined in Claims, for example, a touch panel), each time user settings are made. Since the image forming apparatus 1 can execute a plurality of functions, the backup device 101 saves user settings on the storage device 8 on a function-by-function basis.

For example, when, as shown in FIG. 3, the user sets "Full Color" in terms of "Select Color" through the settings screen SS for the copy function and the touch panel (the operation device 47), the backup device 101 saves on the storage device 8 this user setting as backup data on the copy function.

Furthermore, when the execution of the job based on the user settings is completed, the controller 100 deletes the user settings from the storage device 8.

Moreover, when, in newly displaying a settings screen SS on the display device 473 in order to make settings for another job, user settings for a function configurable in terms of setting items on the settings screen SS are saved on the storage device 8, the controller 100 determines the contents of the user settings as the contents of settings for the job and allows the display device 473 to display a settings screen SS showing the values of the items specified by the user settings.

For example, assume that the user presses the "Copy" button on the operation screen OP1 shown in FIG. 2A and an instruction to select a copy function is thus accepted by the operation device 47. When, at that time, user settings for the copy function are saved as backup data on the storage device 8, the controller 100 determines the contents of the user settings as the contents of settings for a job to be executed and allows the display device 473 to display, not a settings screen SS for default settings shown in FIG. 2B, but a settings screen SS showing the contents of the above user settings as shown as an example in FIG. 3.

Figure 4:
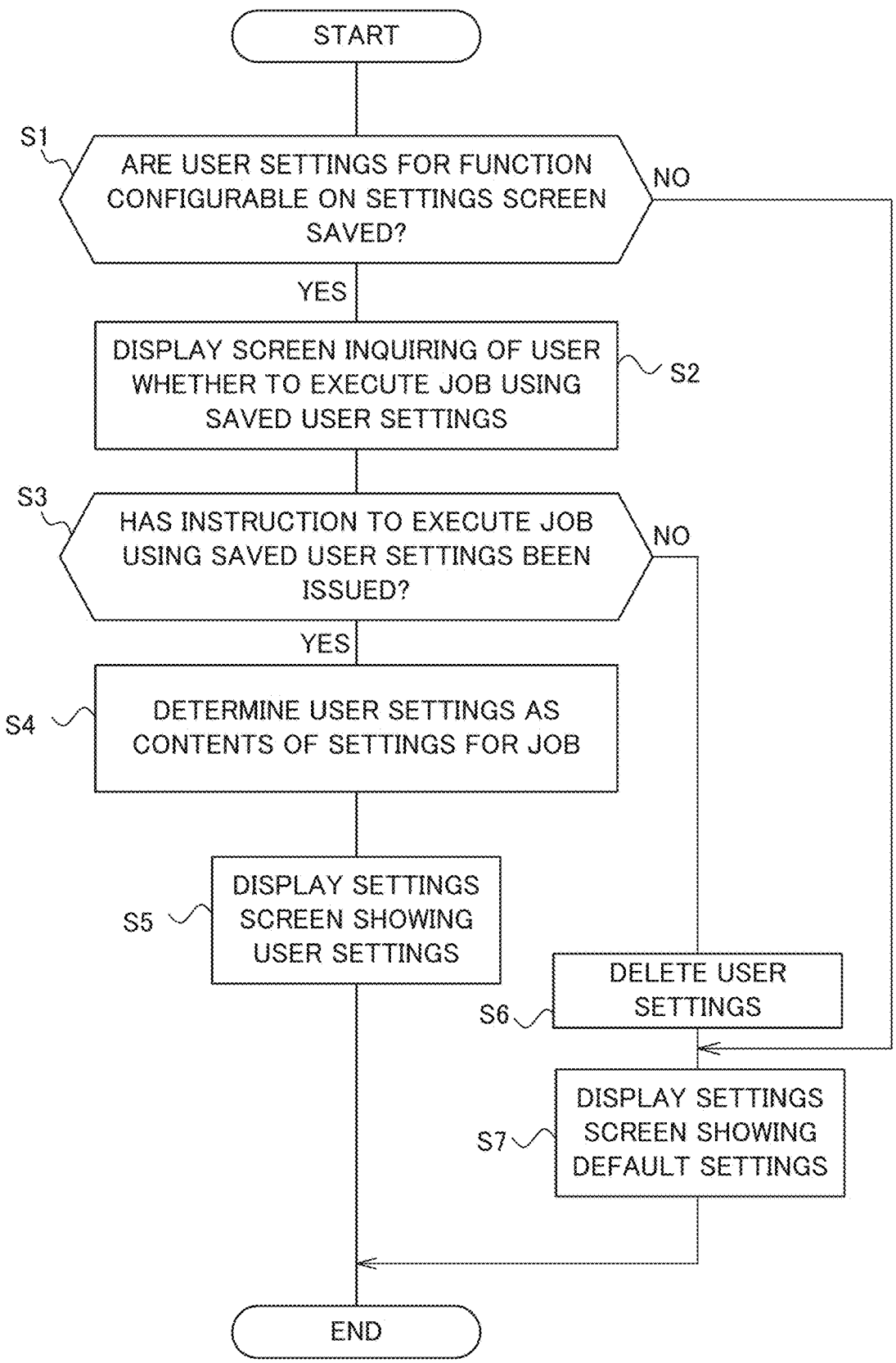
FIG. 4 is a flowchart showing an example of processing executed by a control device of the image forming apparatus.

Next, a description will be given of an example of processing performed by the control device 10 of the image forming apparatus 1 with reference to the flowchart shown in FIG. 4. This processing is performed when the user presses, on the operation screen GP1 shown in FIG. 2A, a button to select one of the functions and an instruction to select the function is thus accepted by the operation device 47. In other words, this processing is performed by the controller 100 in allowing the display device 473 to newly display a settings screen SS.

The controller 100 determines whether or not user settings for a function configurable in terms of setting items on a settings screen SS to be newly displayed for a job are saved as backup data on the storage device 8 (S1). Here, when determining that the user settings (backup data) are saved on the storage device 8 (YES in S1), the controller 100 allows the display device 473 to display a pop-up window PS1 inquiring of the user whether to allow the execution of the job using the user settings saved on the storage device 8 (S2). Then, the controller 100 determines whether an instruction allowing the execution of the job using the user settings has been accepted by the operation device 47 (S3).

Figure 5:
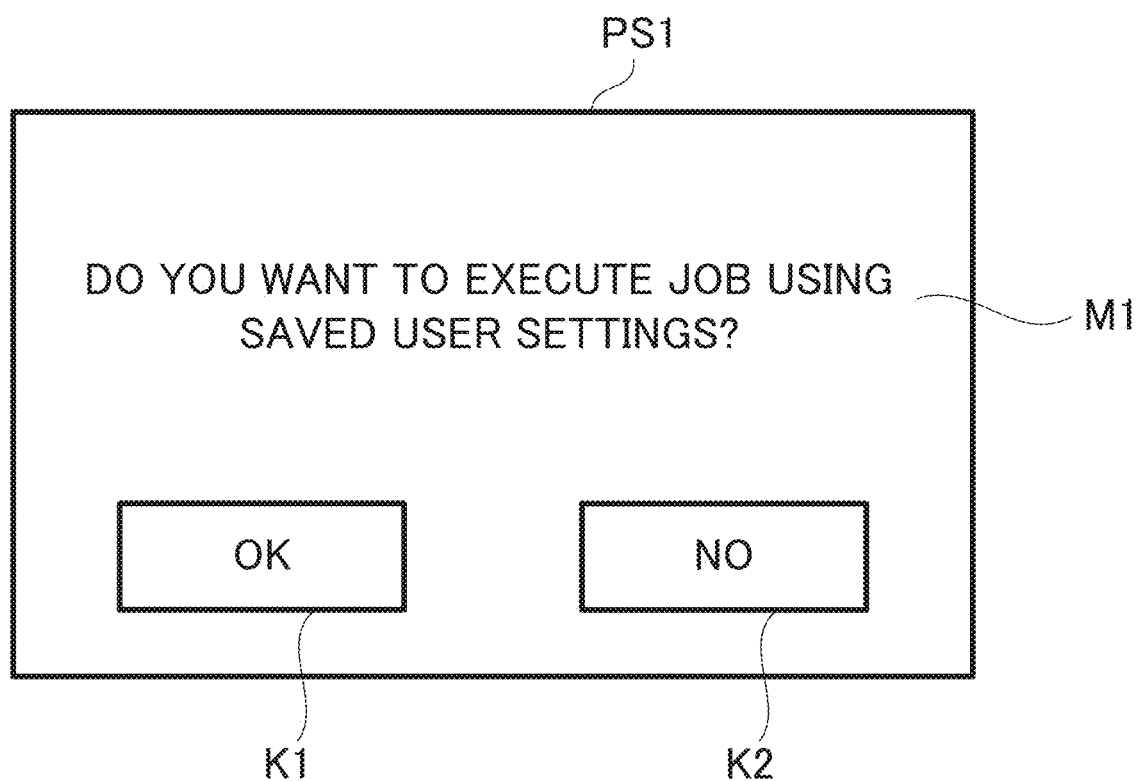
FIG. 5 is a view showing an example of a screen displayed on the display device.

As shown in FIG. 5, the pop-up window PS1 displays a message M1 "DO YOU WANT TO EXECUTE JOB USING SAVED USER SETTINGS?", an operating key K1 labeled "OK", and an operating key K2 labeled "NO". In other words, the pop-up window PS1 contains a message inquiring of the user whether to allow the execution of the job using the user settings saved on the storage device 8.

When the operation device 47 accepts an instruction based on a user's operation on the operating key K1 labeled "OK" displayed on the pop-up window PS1 and the controller 100 determines that the instruction allowing the execution of the job using the user settings has been accepted by the operation device 47 (YES in S3), the controller 100 reads the user settings from the storage device 8, determines the contents of the user settings as the contents of settings for the job (S4), and allows the display device 473 to display a settings screen SS showing the values of the items specified by the user settings (S5). Thereafter, this processing ends.

On the other hand, when the operation device 47 accepts an instruction based on a user's operation on the operating key K2 labeled "NO" displayed on the pop-up window PS1 and the controller 100 determines that the instruction not allowing the execution of the job using the user settings has been accepted by the operation device 47 (NO in S3), the controller 100 deletes the user settings from the storage device 8 (S6) and allows the display device 473 to display a settings screen SS showing the values of the items specified by the default settings (S7). In other words, the controller 100 determines the contents of the user settings not to be the contents of settings for the job and keeps the display device 473 from displaying a settings screen SS showing the contents of the user settings. Thereafter, this processing ends.

Also when determining in S1 that the user settings are not saved on the storage device 8 (NO in S1), the controller 100 allows the display device 473 to display a settings screen SS showing the values of the items specified by the default settings (S7). Thereafter, the processing ends.

Figure 6:
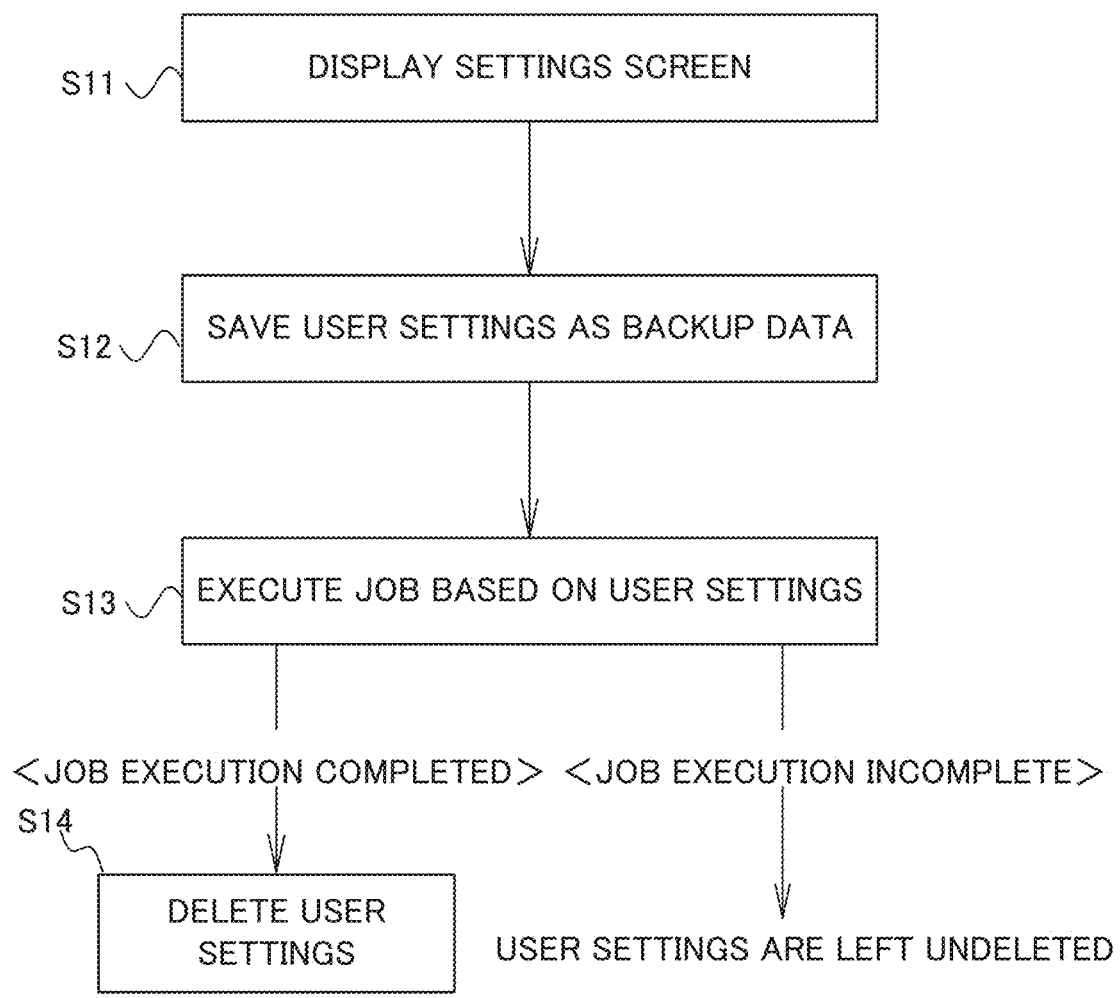
FIG. 6 is a chart showing a flow from the display of a settings screen on the display device, through the execution of a job, to the deletion of user settings as backup data from a storage device.

FIG. 6 is a chart showing a flow from the display of a settings screen SS on the display device 473, through the execution of a job, to the deletion of user settings as backup data from the storage device 8.

When a selection instruction to select a function given by the user on the operation screen OP1 (the home screen HS) has been accepted by the operation device 47, the controller 100 allows the display device 473 to display a settings screen SS (S11).

When user settings are input through the settings screen SS and the operation device 47, the backup device 101 saves the user settings as backup data on the storage device 8 (S12).

When a user's instruction to start executing the job has been accepted by the operation device 47, the controller 100 executes, according to the setting contents indicated by the input user settings, the job for the function specified by the selection instruction (S13). Then, when determining that the execution of the job is completed, the controller 100 deletes the user settings as backup data from the storage device 8 (S14).

When the job has failed to be completed due to occurrence of a failure, such as a power outage or a system crash, the controller 100 does not determine that the execution of the job is completed and, therefore, does not delete the user settings as backup data from the storage device 8. The user settings remain saved on the storage device 8.

Since, in this embodiment, user settings are saved as backup data on the storage device 8 which is a non-volatile storage device each time user settings are made, the user settings are not lost even if a failure, such as a power outage or a system crash, occurs during or before execution of a job, and the setting contents specified by the user settings can be used in executing a job for the same function next time.

Furthermore, in newly displaying a settings screen SS for a job for the same function on the display device 473, the contents of the above user settings are adopted as the contents of settings for the job and a settings screen SS showing the values of the items specified by the user settings is displayed on the display device 473. Therefore, in executing a job for the same function again, the user does not need to do any special work in order to use the setting contents specified by the user settings. Hence, even if a power outage, a system crash or like failure occurs, the user settings serving as the contents of settings for the job can be efficiently recovered. In addition, the recovery is made in the presence of a user's instruction, which avoids the occurrence of an inconvenience that past user settings are recovered although not required by the user.

In a general image forming apparatus, if a power outage, a system crash or like failure occurs during execution of a job (for example, a copy job), the job will fail to be completed and information on settings will be lost. Therefore, in order to execute such an incomplete job again, the user needs to configure job settings from the beginning. This is stressful for the user and inefficient in working. Likewise, even before the execution of a job, the occurrence of such a failure as described above leads to loss of information on settings and the necessity for the user to configure job settings from the beginning.

In the case of the image forming apparatus disclosed in BACKGROUND, information on settings for a job can be recovered by previously saving it in an external storage medium. However, this needs a user's work for reading the information on settings from the external storage medium, which is less than good in working efficiency. In order to save information on settings, it is necessary to connect the external storage medium to the image forming apparatus, which is burdensome. Furthermore, if such a failure as described above occurs before the saving of information on settings in the external storage medium, the information on settings will be lost and cannot be recovered.

In contrast, in the above embodiment, even if a power outage, a system crash or like failure occurs, the contents of settings for a job can be efficiently recovered.

FIG. 7 is a functional block diagram schematically showing an essential internal configuration of an image forming apparatus according to a second embodiment. Further explanation of the same structures and configurations as in the image forming apparatus 1 according to the first embodiment will be omitted.

The image forming apparatus 1 according to the second embodiment is different from that according to the first embodiment shown in FIG. 1 in that the control device 10 includes, in addition to the configuration thereof in the first embodiment, a log-in processor 102 and that the backup device 101 saves user settings as backup data on the storage device 8 on a user-by-user basis. When the processor operates in accordance with a control program stored in the storage device 8, the control device 10 functions as the controller 100, the backup device 101, and the log-in processor 102.

The log-in processor 102 performs user authentication processing. Specifically, when the operation device 47 accepts log-in information based on a user's operation, the log-in processor 102 determines whether or not the accepted log-in information is registered. When determining that the log-in information is identical to previously stored and registered log-in information, the log-in processor 102 permits the user to log in the image forming apparatus 1. At this time, the log-in processor 102 identifies the individual user of the image forming apparatus 1. The log-in processor 102 is an example of the individual identifier defined in CLAIMS.

The backup device 101 saves user settings as backup data on the storage device 8 for each user identified by the log-in processor 102. The controller 100 reads from the storage device 8 the user settings for the user identified by the log-in processor 102 and, upon next configuration of settings for a job related to the same function, determines the contents of the user settings as the contents of settings for the job. Alternatively, when the operation device 47 accepts an instruction to use the user settings for the user identified by the log-in processor 102, the controller 100 determines, upon next configuration of a job related to the same function, the contents of the user settings for the user identified by the log-in processor 102 as the contents of settings for the job. In doing so, the controller 100 allows the display device 473 to display a settings screen SS showing the values of the items specified by the user settings. On the other hand, when the operation device 47 accepts an instruction not to use the user settings for the user identified by the log-in processor 102, the controller 100 does not adopt as the contents of settings for the job the contents of any user settings backed up on the storage device 8. In doing so, the controller 100 keeps the display devices 473 from displaying a settings screen SS showing the values of the items specified by the user settings and instead allows the display device 473 to display a settings screen SS showing the values of the items specified by the default settings.

In the second embodiment, user settings as backup data are saved user by user and user settings are recovered according to each individual user identified by the log-in processor 102. This enables avoidance of the occurrence of a situation where the user settings for the individual user are used in setting the contents of a job for a different user.

The present disclosure is not limited to the above embodiments and can be modified in various ways. The structures, configurations, and processing of the above embodiments described with reference to FIGS. 1 to 7 are merely illustrative of the present disclosure and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   a display device;
   an instruction acceptor that accepts an instruction from a user;
   a non-volatile storage device; and
   a control device that includes a processor and functions, through the processor executing a control program, as:
      a controller that allows the display device to display a settings screen on which the user makes a user setting for an executable function, and executes a job based on the user setting accepted by the instruction acceptor through the settings screen; and
      a backup device that backs up the user setting on the non-volatile storage device each time the instruction acceptor accepts the user setting,
   wherein when execution of the job based on the user setting is completed, the controller deletes the user setting from the non-volatile storage device, and when execution of the job based on the user setting is interrupted, the controller remains the user setting on the non-volatile storage device without deleting the user setting from the non-volatile storage device,
   when, in newly displaying the settings screen on the display device, the user setting is backed up on the non-volatile storage device, the controller allows the display device to display the settings screen showing the content of the user setting.

2. The image forming apparatus according to claim 1, wherein when, in newly displaying the settings screen on the display device, the user setting is absent from the non-volatile storage device, the controller keeps the display device from displaying the settings screen showing the content of the user setting.

3. The image forming apparatus according to claim 1, wherein
   before allowing the display device to newly display the settings screen, the controller allows the display device to display a message prompting the user to input an instruction of whether to use the user setting,
   when an instruction to use the user setting is accepted by the instruction acceptor, the controller allows the display device to display the settings screen showing the content of the user setting backed up on the non-volatile storage device, and
   when an instruction not to use the user setting is accepted by the instruction acceptor, the controller keeps the display device from displaying the settings screen showing the content of the user setting.

4. The image forming apparatus according to claim 3, wherein when the instruction not to use the user setting is accepted by the instruction acceptor, the controller deletes the user setting backed up on the non-volatile storage device.

5. The image forming apparatus according to claim 1,
   the control device further functions as an individual identifier that identifies the user,
   wherein the backup device backs up the user setting on the non-volatile storage device for each user identified by the individual identifier,
   when an instruction to use the user setting is accepted by the instruction acceptor, the controller allows the display device to display the settings screen showing the content of the user setting for the user identified by the individual identifier, and
   when an instruction not to use the user setting is accepted by the instruction acceptor, the controller keeps the display device from displaying the settings screen showing the content of any of the user settings backed up on the non-volatile storage device.

* * * * *